United States Patent
Price, III et al.

(10) Patent No.: US 7,830,457 B2
(45) Date of Patent: Nov. 9, 2010

(54) MULTIPLE VIDEO SOURCE MANAGEMENT

(75) Inventors: James D. Price, III, Foothill Ranch, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 979 days.

(21) Appl. No.: 11/350,455

(22) Filed: Feb. 9, 2006

(65) Prior Publication Data
US 2007/0182867 A1    Aug. 9, 2007

(51) Int. Cl.
*H04N 5/50* (2006.01)
(52) U.S. Cl. .................................................. 348/731
(58) Field of Classification Search ................. None
See application file for complete search history.

(56) References Cited

U.S. PATENT DOCUMENTS

| | | | |
|---|---|---|---|
| 6,519,011 B1 * | 2/2003 | Shendar | 348/731 |
| 6,771,722 B2 * | 8/2004 | Diehl et al. | 375/346 |
| 6,973,621 B2 | 12/2005 | Sie et al. | |
| 6,973,663 B1 | 12/2005 | Brown et al. | |
| 6,973,665 B2 | 12/2005 | Dudkiewicz et al. | |
| 2002/0067438 A1 * | 6/2002 | Baldock | 348/731 |
| 2003/0226153 A1 * | 12/2003 | Bessel et al. | 725/152 |
| 2004/0189879 A1 * | 9/2004 | Read | 348/731 |
| 2005/0149975 A1 | 7/2005 | Jutzi | |

FOREIGN PATENT DOCUMENTS

WO    2005067256    7/2005

\* cited by examiner

*Primary Examiner*—Paulos M Natnael
(74) *Attorney, Agent, or Firm*—Haynes and Boone, LLP.

(57) ABSTRACT

Systems and techniques for managing multiple video sources are described. Video data for a first channel may be displayed and buffered, while video data for a second channel that is not being displayed or recorded is also being buffered. The second channel may be a previous display channel and/or a predicted future channel.

20 Claims, 3 Drawing Sheets

MULTIPLE VIDEO SOURCE MANAGEMENT

BACKGROUND

1. Field of Invention

This invention generally relates to video technology, particularly to managing multiple video sources.

2. Related Art

For many years, television was relatively simple. A consumer purchased a television, and received broadcast video signals over an antenna. The number of available channels was limited to those channels for which a sufficient signal was With the advent of cable and satellite television, video cassette recorders (VCRs), digital video disc (DVD) systems, digital video recorder (DVR) systems, and set-top boxes (Internet protocol (IP) or traditional), consumers have access to a large number of channels and a wide variety of personal video recording devices (PVRs).

DVR systems are relatively new to the consumer market, but are being widely embraced by consumers looking for easier and more flexible ways to time-shift their viewing. While VCRs require a user to use external media to record programming, DVR systems include high capacity internal storage (e.g., one or more high capacity hard drives). Additionally, DVR systems may provide a number of advantages not found with available VCR systems, like periodic channel and schedule updating, user-defined recording criteria, and the like.

Another emerging technology is the IP set-top box. An IP set-top box is a dedicated computing device that acts as an interface between a television and a network (such as an IP-based network). IP set-top boxes are able to provide many of the advantages of DVR systems, and may also receive video data over IP connections (rather than traditional video connections such as cable and satellite connections). Like DVR systems, IP set-top boxes provide easier and more flexible time-shifted viewing.

As device manufacturers expand the capabilities of their products, many are beginning to provide users with the ability to record and/or view multiple programs at the same time. For example, some available DVR systems employ multiple tuners to allow recording/viewing of multiple programs at the same time. For IP set-top boxes, the number of simultaneous incoming video sources is no longer limited directly by the number of physical interfaces on the device. In current systems the primary tuner alone is active when a single channel is being viewed or recorded. If the secondary tuner was active (due to, e.g., recording), the tuner may remain locked onto a channel and continue to buffer data for that channel. Thus, if the user returns to channel x after viewing channel y, the system needs to re-lock on channel x. Therefore, the user may experience delay due to the reacquisition and locking of the video signal and/or data buffering.

DETAILED DESCRIPTION

Systems and techniques provided herein allow for improved flexibility and image quality for recording and display systems, compared to available systems.

In existing DVR systems, video data is stored in two ways. First, video data is stored in response to user selection of one or more recording options. For example, a user may pre-select one or more programs to be recorded, may select recording criteria (e.g., all football games with a particular team), or may simply select a "Record" option to record the current program.

Second, video data for the active channel is automatically stored in a buffer. This feature allows the user to pause the program, then resume play at the point at which the program was paused. In systems employing multiple tuners, when a single channel is being viewed and no programming is being recorded, the primary tuner is active and other tuners are inactive. While a user is watching a program on the active channel, the system buffers the active channel video data from the primary tuner. If the user changes channels, the primary tuner locks onto the selected channel, the buffer is emptied, and the system begins to buffer data for the new channel.

By contrast, systems and techniques described herein allow for higher quality display, as well as more flexible programming and/or viewing, by providing efficient use of multiple video sources. Herein, the term "video source" refers to an analog or digital source of video information; for example, an analog, digital, or satellite tuner, or software and/or hardware to generate a video data stream for a particular channel from incoming video data for a plurality of channels.

Figure 1:
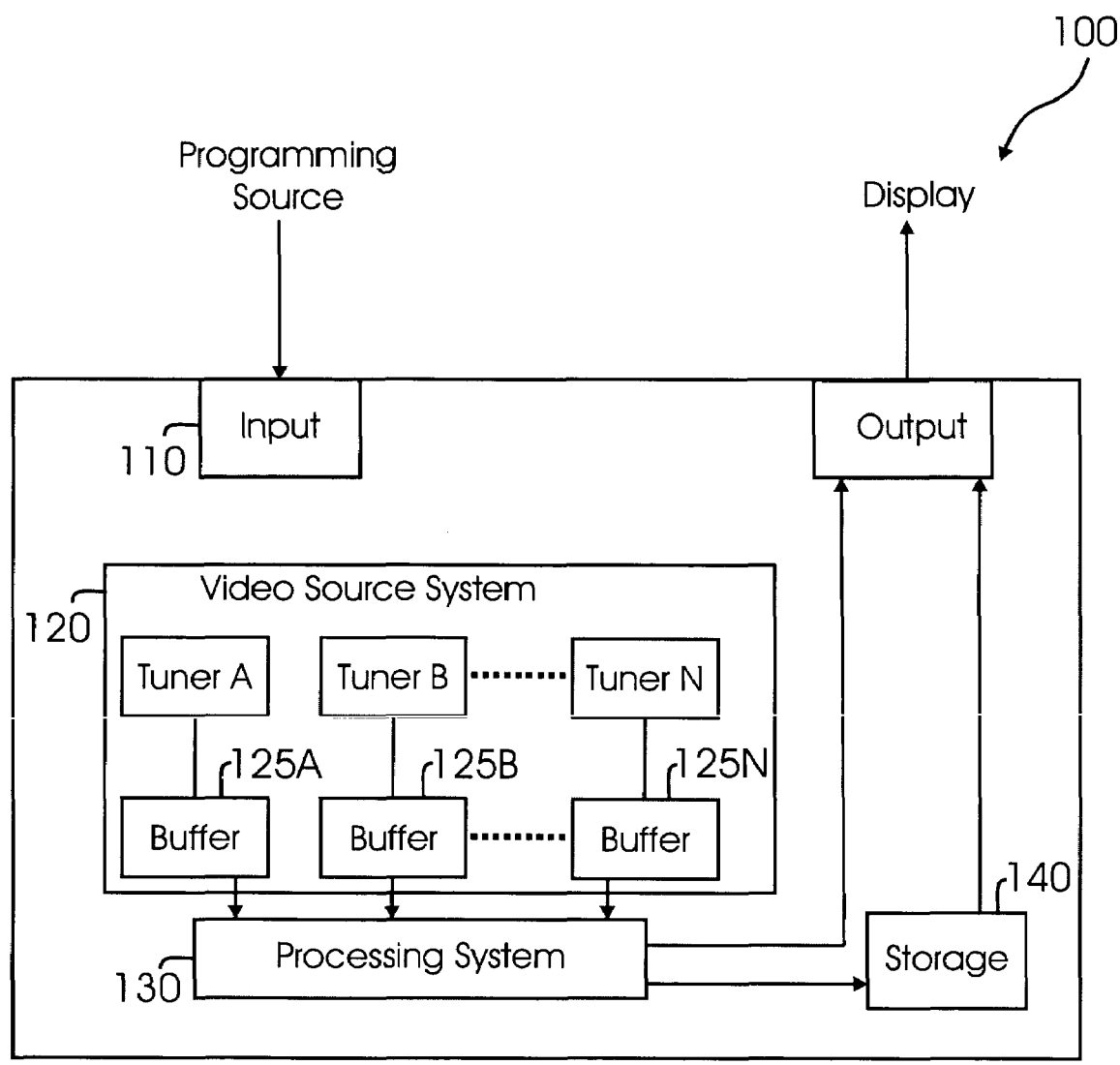
FIG. 1 is a diagram of a digital video system, according to some embodiments.

FIG. 1 shows an embodiment in which the systems and techniques are implemented in a digital video system 100. Note that the phrase "digital video system" as used herein applies to a system that is configured to store digital video data and to provide data to be displayed to a user, and includes systems such as DVR systems and set top box systems.

Video information is received from a programming source on an input interface 110. For example, an analog or digital video signal is received from a cable or satellite source, or a data stream including programming data for multiple channels is received on a data interface such as an 10/100 base T interface. The video information is received by a video source system 120 configured to generate separate streams of digital video data for at least two different channels.

For example, video source system 120 may include a plurality of tuners such as Tuners A and B of FIG. 1. In another example, video source system 120 may include software and/or hardware to separate programming information for multiple channels (e.g., programming data for multiple channels included in a data stream). For analog input video signals, video source system 120 may further include one or more analog to digital converters (not shown) to convert an analog video signal to digital video data.

Video source system 120 further includes a plurality of storage elements such as buffers 125A, 125B, . . . 125 n, where each buffer is associated with a video source. For embodiments in which the video source includes software/hardware to separate programming data for a particular channel from programming data for multiple channels, the number of video sources of video source system 120 may be thought of as the number of buffers to store video data for different channels.

Video source system 120 transmits signal information to a processing system 130. Processing system 130 may also include one or more processors to execute instructions, as well as storage for instructions and data to perform a number of operations. For example, system 130 may include instructions to encode and/or decode digital video data according to one or more protocols, such as one or more of the MPEG protocols. Processing system 130 may be further configured to execute program instructions to implement techniques described herein. For example, system 130 may include data and instructions stored on a machine-readable medium to perform an embodiment of a method 200 such as that shown in FIG. 2 and described below.

System 100 may further include storage 140 configured to store a large amount of video information. For example, storage 140 may comprise one or more hard drives, for a total storage capacity of at least 1 gigabyte (Gb). Storage 140 provides the user with the ability to record (store) a large quantity of video information for later viewing.

System 100 may further comprise an output interface 150 to receive video information from processing system 130 and/or storage 140 to output to a display. In one example, encoded video data is stored in storage 140, decoded using processing system 130, and provided to a television or other display device via output interface 150.

Figure 2:
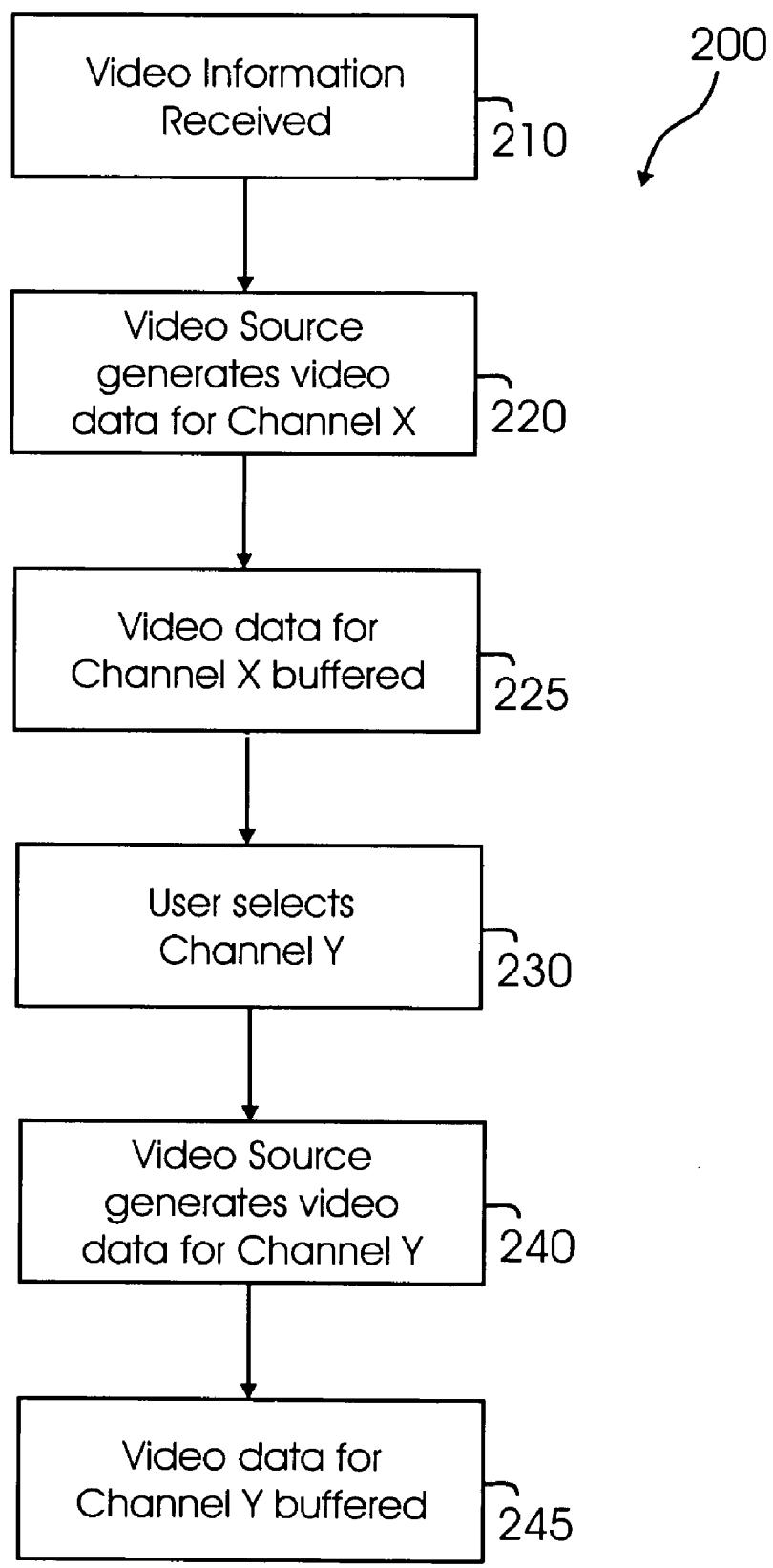
FIG. 2 is a method that may be implemented using a system such as that shown in FIG. 1, according to some embodiments.

As noted above, a system such as system 100 may be used to execute instructions to perform an embodiment of a method 200 shown in FIG. 2. At 210, video information is received in a system such as system 100 of FIG. 1. At 220, the system locks onto user selected channel x using a first video source (e.g., using tuner A, or using hardware and/or software to isolate video data associated with channel x from a video data stream), and generates video data for channel x. Video data corresponding to channel x is automatically buffered once the system locks onto channel x at 225.

At 230, the user selects a new channel y (e.g., selects an "up" or "down" option on a remote control to view the channel above or below channel x, or a selects a specific channel number). At 240, the system locks onto user selected channel y using a second video source such as a tuner B. At 245, video data corresponding to channel y is automatically buffered once the system locks onto channel y.

However, unlike available systems, the first video source remains locked on channel x, and video data associated with channel x continues to be automatically buffered. Therefore, if the user decides to return to channel x, the buffered data is available. The user may then be able to view the portion of the programming for channel x that was scheduled for display during the time the programming of channel y was displayed.

Systems and techniques such as those shown in FIGS. 1 and 2 and described above may not only increase the system's flexibility, but may also provide improved display quality. For example, as noted above, in current systems the primary tuner alone is active when a single channel is being viewed or recorded. If the secondary tuner was active (due to, e.g., recording), the tuner may remain locked onto a channel and continue to buffer data for that channel.

However, in the current disclosure, the video source system stays locked on multiple channels, based on the channel display history (the channels that have been displayed based on user selection), even when a single channel is being viewed. Thus, if the user returns to channel x after viewing channel y, the system does not need to re-lock on channel x. Therefore, the user does not experience delay due to the reacquisition and locking of the video signal and/or data buffering.

Figure 3:
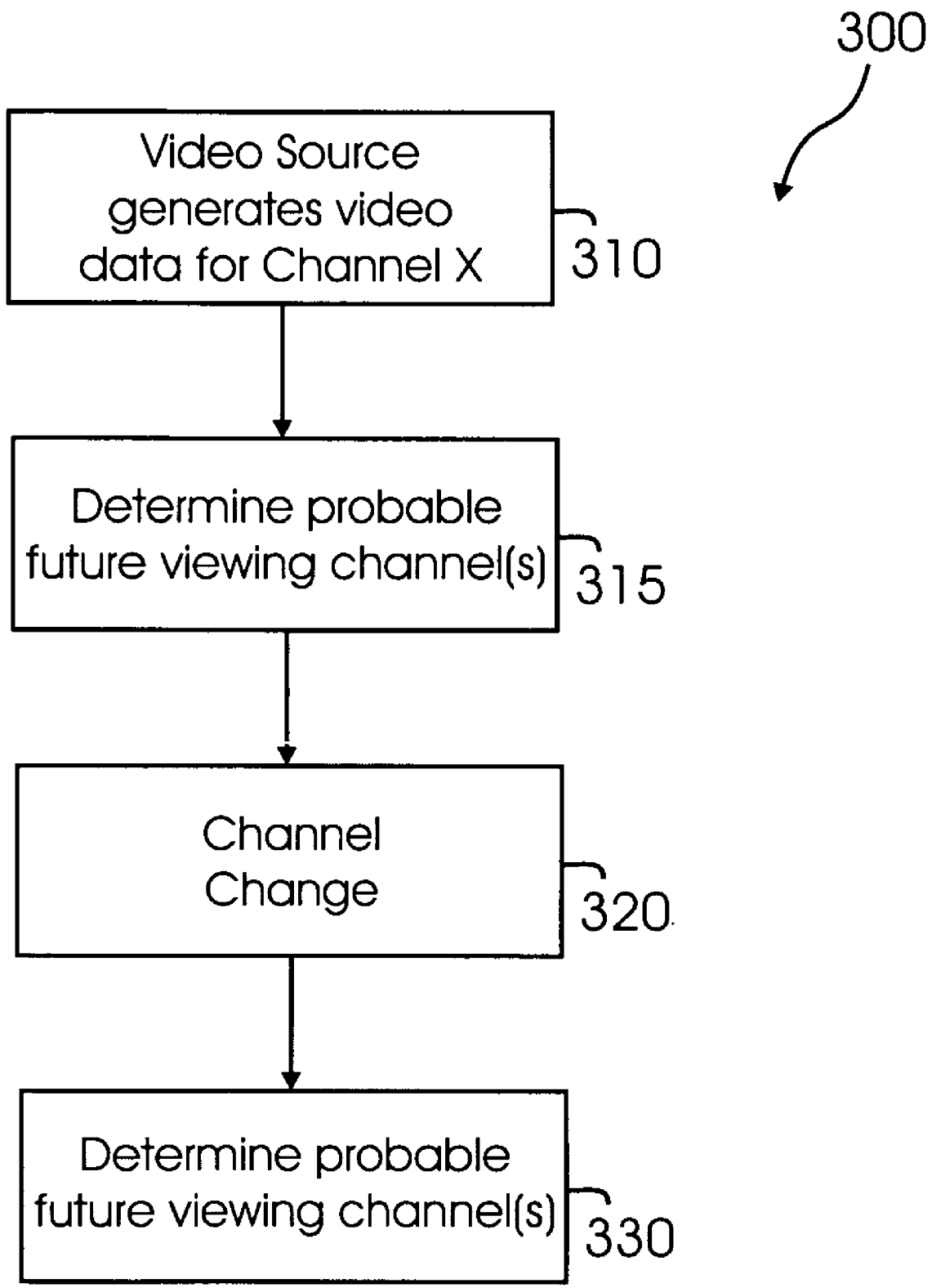
FIG. 3 is another method that may be implemented using a system such as that shown in FIG. 1, according to some embodiments; and Like reference symbols in the various drawings indicate like elements.

The systems and techniques provided herein may also allow for intelligent management of a system such the system illustrated in FIG. 1. That is, data indicative of current and/or past viewing activity may be used to determine one or more probable future viewing channels. This information may be used to lock the video source on a probable future viewing channel. Data may also be buffered for that probable future viewing channel. FIG. 3 shows an embodiment of a method 300 that may be implemented using data and instructions stored on a machine-readable medium of a system such as the system of FIG. 1.

At 310, a video source of the system (e.g., a tuner) generates video data for a current active channel (e.g., channel x) from received video information for a plurality of channels. At 315, for other available video sources (e.g., all sources not generating data for a current active channel or a channel being recorded), the system determines a probable future viewing channel, locks the other video sources onto a probable future channel, and buffers video data into an associated buffer. For example, if a user turns on a television with channel x as the initial active channel, the system may determine an additional probable future viewing channel for each of the other unused tuners.

At 320, the user initiates a channel change to channel y. Channel y may be the next channel up or down from channel x, or may be a different channel. As above, the system may continue to buffer data from channel x, and begin to buffer data from channel y. Other video sources may continue to buffer data from the same probable future channel, or the system may determine a different probable future channel for at least one of the other video sources.

Based on properties of channel x and/or channel y, the system may determine a probable channel z at 330. A video source may lock on channel z and begin to buffer programming data, prior to user selection of channel z for display. For example, when channel y is the next channel up from channel x, the system may lock a video source on the next channel up from channel y.

Table 1 below shows an example of such a sequence in a three tuner system, with a user-initiated channel change between each configuration:

| Initial configuration (e.g., power on): | | | |
|---|---|---|---|
| Active: | | | * |
| Tuner: | A | B | C |
| Channel: | 2 | 3 | 4 |
| Second configuration: | | | |
| Active: | | | * |
| Tuner: | A | B | C |
| Channel: | 5 | 3 | 4 |
| Third configuration: | | | |
| Active: | * | | |
| Tuner: | A | B | C |
| Channel: | 5 | 6 | 4 |
| Fourth configuration: | | | |
| Active: | | * | |
| Tuner: | A | B | C |
| Channel: | 5 | 6 | 7 |

For the above example, the initial displayed channel is channel 3. That is, tuner B is initially locked onto channel 3, and video data is stored in an associated buffer. In the existing systems described above, tuners A and C would be inactive. However, according to embodiments of the current invention, the other tuners are locked onto other channels based on the current active channel (in this example, the tuners are locked onto channels above and below the active channel, since one common user pattern is to view available channels sequentially). Data for those other channels is stored in associated buffers.

In the example above, the user subsequently selects channel 4, the channel above the active channel. Tuner C has already been locked onto channel 4 (as a probable future channel), and its data is already being buffered. The system further determines that channel 5 is a probable future channel, and locks Tuner A on channel 5 rather than channel 2. Tuner B remains locked on channel 3, and data from channel 3 continues to be buffered. The user subsequently selects channels 5 and 6, continuing to view available channels in ascending order, and the system responds accordingly.

In the example above, the system determines probable future channels based on the idea that users frequently "channel surf" by pressing the "Channel Up" or "Channel Down" selections on a remote. That is, the system determines probable future channels based on channel sequence criteria. However, other criteria may be used to determine probable future channels. For example, the system may determine that a user is selecting channels based on content type (such as sports programming, news programming, children's programming, reality programming, situation comedy programming, etc.). The system may determine probable future channels based on the content type.

In another example, the system may select one or more probable future channels using user-based criteria (since particular users may view particular channels more frequently than others), time-based criteria (since users may preferentially select certain programs or types of programs at particular times of day), or other criteria.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A method comprising:
receiving video information for a plurality of available channels;
displaying data for a display channel of the plurality of available channels;
automatically buffering data for the display channel concurrently with displaying data for the display channel;
determining a probable future display channel of the plurality of available channels based on one or more characteristics of the display channel, wherein data for the probable future display channel is not being displayed or recorded during the displaying data for the display channel;
automatically buffering data for the probable future display channel during the displaying data for the display channel;
receiving a user selection for a new display channel;
displaying data for the new display channel and continuing to automatically buffer data for the display channel;
determining a new probable future display channel of the plurality of available channels based on one or more characteristics of the new display channel whenever data is displayed for the new channel, wherein data for the new probable future display channel is not being displayed or recorded during the displaying data for the new display channel; and
automatically buffering data for the new probable future display channel during the displaying data for the new display channel.

2. The method of claim 1, wherein the one or more characteristics of the display channel include the channel number.

3. The method of claim 1, wherein the one or more characteristics of the display channel include an associated content type.

4. The method of claim 1, further comprising:
displaying data for a previous display channel of the plurality of available channels prior to displaying data for the display channel; and
wherein determining the probable future display channel of the plurality of available channels based on one or more characteristics of the display channel further comprises determining the probable future display channel based on one or more characteristics of the previous display channel.

5. The method of claim 4, further comprising automatically buffering data for the previous display channel during the displaying data for the display channel.

6. A video system comprising:
an input interface configured to receive video information for a plurality of available channels;
a first video source and an associated first buffer, the first video source configured to receive the video information for the plurality of available channels from the input interface and to store video data for a first channel in the associated first buffer;
a second video source and an associated second buffer, the second video source configured to receive the video information for the plurality of available channels from the input interface and to store video data for a second channel in the associated second buffer;
a third video source and an associated third buffer, the third video source configured to receive the video information for the plurality of available channels from the input interface and to store video data for a third channel in the associated third buffer; and
an output interface configured to receive video data for one of the first, second, and third channels to transmit to a display concurrently with the storing video for the others of the first, second and third channels in the associated one of the first, second and third buffers, wherein the others of the first, second, and third channels are selected based on a channel display history and wherein a probable future display channel of the plurality of available channels is determined whenever data is displayed for the video data for the one of the first, second, and third channels and wherein at least one of the buffers continues to automatically buffer data for the one of the first, second, and third channels of the display when a new channel is displayed.

7. The system of claim 6, wherein at least one of the others of the first, second, and third channels is a previous display channel selected based on the channel display history.

8. The system of claim 6, wherein at least one of the others of the first, second, and third channels is a probable future display channel selected based on the channel display history.

9. The system of claim 8, further comprising a machine-readable storage medium embodying information indicative of instructions that when performed by one or more machines result in operations comprising:
   determining the probable future display channel based on one or more characteristics of the one of the first, second, and third channels.

10. The system of claim 9, wherein the one or more characteristics include at least one of a channel number of the one of the first, second, and third channels and a content type of the one of the first, second, and third channels.

11. The system of claim 8, further comprising a machine-readable medium embodying information indicative of instructions that when performed by one or more machines result in operations comprising:
   determining the probable future display channel based on one or more viewing characteristics of the video system, wherein the one or more viewing characteristics include at least one of user-based characteristics and time-based characteristics.

12. A video system comprising:
   means for receiving video information for a plurality of available channels;
   means for displaying data for a display channel of the plurality of available channels;
   means for automatically buffering data for the display channel concurrently with displaying data for the display channel;
   means for determining a probable future display channel of the plurality of available channels based on one or more characteristics of the display channel, wherein data for the probable future display channel is not being displayed or recorded during the displaying data for the display channel;
   means for automatically buffering data for the probable future display channel during the displaying data for the display channel;
   means for receiving a user selection for a new display channel;
   means for displaying data for the new display channel and continuing to automatically buffer data for the display channel;
   means for determining a new probable future display channel of the plurality of available channels based on one or more characteristics of the new display channel whenever data is displayed for the new channel, wherein data for the new probable future display channel is not being displayed or recorded during the displaying data for the new display channel; and
   means for automatically buffering data for the new probable future display channel during the displaying data for the new display channel.

13. The system of claim 12, wherein the one or more characteristics of the display channel include the channel number.

14. The system of claim 12, wherein the one or more characteristics of the display channel include an associated content type.

15. The system of claim 12, further comprising:
   means for displaying data for a previous display channel of the plurality of available channels prior to displaying data for the display channel; and
   wherein determining the probable future display channel of the plurality of available channels based on one or more characteristics of the display channel further comprises determining the probable future display channel based on one or more characteristics of the previous display channel.

16. The system of claim 15, further comprising means for automatically buffering data for the previous display channel during the displaying data for the display channel.

17. An article comprising a machine-readable storage medium embodying information indicative of instructions that when performed by one or more machines result in operations comprising:
   receiving video information for a plurality of available channels including a display channel;
   automatically buffering data for the display channel;
   determining a probable future display channel of the plurality of available channels based on one or more characteristics of the display channel, wherein data for the probable future display channel is not being displayed or recorded during the displaying data for the display channel;
   determining a new probable future display channel of the plurality of available channels based on one or more characteristics of a new display channel whenever data is displayed for the new channel,
   continuing to automatically buffer data for the display channel when displaying data for the new display channel; and
   automatically buffering data for the new probable future display channel during the displaying data for the new display channel.

18. The article of claim 17, wherein the one or more characteristics of the display channel include the channel number.

19. The article of claim 17, wherein the one or more characteristics of the display channel include an associated content type.

20. The article of claim 17, wherein the operations further comprise:
   automatically buffering data for the probable future display channel, wherein data for the probable future display channel is not being displayed or recorded during the displaying data for the display channel.

* * * * *